United States Patent [19]

Neefe

[11] 4,202,848

[45] May 13, 1980

[54] METHOD OF MAKING BIFOCAL CONTACT LENSES

[76] Inventor: Charles W. Neefe, Box 429, Big Spring, Tex. 79720

[21] Appl. No.: 972,526

[22] Filed: Dec. 22, 1978

Related U.S. Application Data

[63] Continuation-in-part of Ser. No. 874,934, Feb. 3, 1978, Pat. No. 4,150,073, which is a continuation-in-part of Ser. No. 793,388, May 25, 1977, abandoned.

[51] Int. Cl.² .................. B29D 11/00; B29C 17/10
[52] U.S. Cl. ............................ 264/1; 51/216 LP; 51/284 R; 82/11; 82/18
[58] Field of Search ................. 264/1, 138, 162; 425/808; 51/284 R, 216 LP; 82/11, 12, 18

[56] References Cited

U.S. PATENT DOCUMENTS

| | | | |
|---|---|---|---|
| 2,306,868 | 12/1942 | Duckwall | 51/284 |
| 2,545,447 | 3/1951 | Clement | 51/284 |
| 3,460,928 | 8/1969 | Casko | 264/1 |

*Primary Examiner*—James B. Lowe

[57] ABSTRACT

A method of making bifocal contact lenses by cutting the distant power on a lathe with an off center rotation to produce a prism lens, removing the lens from the lathe, turning the lens 180°, replacing the lens on the off center lathe, and cutting the near power segment.

2 Claims, 5 Drawing Figures

METHOD OF MAKING BIFOCAL CONTACT LENSES

Continuation-in-part of application Ser. No. 874,934, filed Feb. 3, 1978 now U.S. Pat. No. 4,150,073 entitled: A METHOD OF CONTROLLING THE ADHESION OF A MOLDED PLASTIC LENS, which is a continuation-in-part of application Ser. No. 793,388, filed May 25, 1977, now abandoned, entitled: A METHOD OF MAKING HIGH QUALITY PLASTIC LENSES.

BACKGROUND OF THE INVENTION

The use of plastic materials for making optical lenses has increased rapidly for the past ten years. This is due to the availability of better plastic materials and the physical advantages of the plastic resins for specific applications such and contact lenses. The technology for the production of high quality contact lenses has not kept pace with the material supply industry. It is important to advance both areas if the full potential is to be realized.

The current lens molds are fabricated from glass, each mold is individually ground and polished to the required specifications. To achieve accurate reproduction of the bifocal molds is most difficult and expensive. This new process makes possible exact reproductions and has many other distinct advantages which will become apparent from the following disclosure.

An object is to provide a process for making inexpensive bifocal contact lenses which may be made to identical specifications.

THE LENSES ARE MADE AS FOLLOWS

A master positive mold having the curvature required on the concave surface of the finished lens is made from glass, stainless steel or other materials which withstand the molding pressures and temperatures. Materials which may be electroplated or plated by vacuum disposition have also been used.

The master positive mold is placed in a sleeve, a molding grade of a resinous material such as polyimide, polycarbonate, polymethylpentene, polyethylene, polypropylene, or other molding material is also placed in the sleeve. The sleeve and it's contents are heated to the softening point of the molding material, pressure is applied to form the negative lens mold. The sides of the master mold have been cut to a smaller diameter than the sleeve to provide an opening around the mold. When sufficient heat and pressure have been applied the molding compound will fill the area around the positive mold forming a cup-like cavity with a curved optical surface at the bottom. Either injection or compression molding may be used to produce the negative resinous mold. A liquid or syrup monomer material containing a suitable catalyst is placed over the optical surface of the mold and covered to prevent evaporation of the monomer. The liquid monomer is polymerized within the mold to form a solid monolithic mass. Ultraviolet light, microwave energy or heat may be used to speed the polymerization process. Thermosetting and crosslinked hard materials may be used to produce lenses which are very dimensionally stable and could not be made by injection or compression molding. This process is also suitable for the production of soft contact lenses made from Hydroxeythyl Methacrylate which cannot be made by compression or injection molding techniques.

Figure 1:
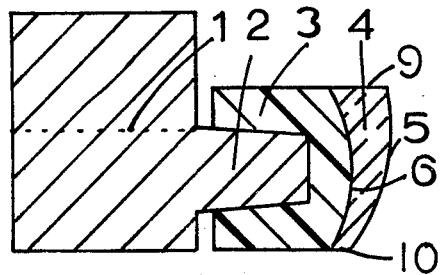
FIG. 1 shows the lens on the lathe with the distant power cut, in section.
Figure 2:
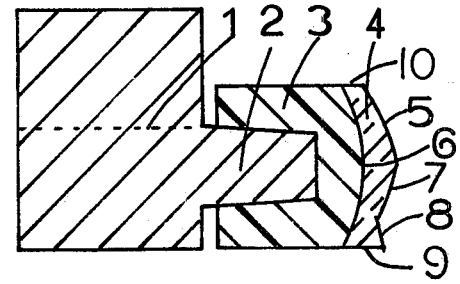
FIG. 2 shows lens rotated 180° and replaced on the lathe and the near segment cut, in section.
Figure 3:
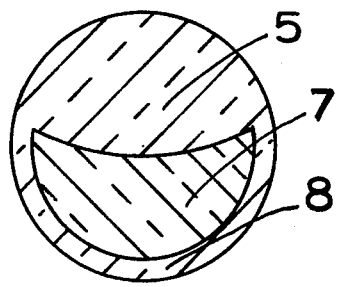
FIG. 3 shows the finished lens from the front.
Figure 4:
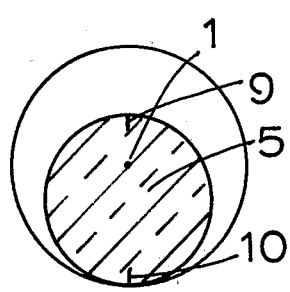
FIG. 4 shows the lens as in FIG. 1 from the front.
Figure 5:
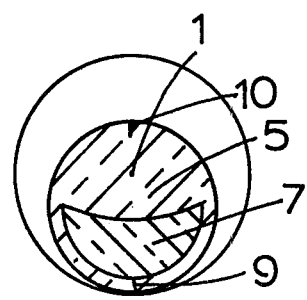
FIG. 5 shows the lens as in FIG. 2 from the front.

It is not necessary to remove the hardened plastic lens material from the mold before cutting the convex bifocal curve. The mold, which is the arbor with the lens mounted, may be placed in a suitable lathe or grinding machine and the convex bifocal curvature cut and polished. A lathe with an off center eccentric male taper, 2 FIGS. 1 and 2, is used to cut the distant convex refractive power curve, 5 FIGS. 1, 2, 3, 4 and 5. The concave curve, 6 FIGS. 1 and 2, may be molded or cut and polished by methods well known to the art. The taper, 2 FIG. 1, is offset from the center of rotation, 1 FIGS. 1, 2, 4 and 5, to produce a prism lens having a thin apex, 10 FIGS. 1 and 4, and a thick base, 9 FIGS. 1 and 4. The lens arbor, 3 FIGS. 1 and 4, is indexed, removed from the lathe and rotated 180° and replaced on the lathe reversing the position of the prism apex, 10, and base, 9 FIGS. 2 and 5. The lathe radius is changed to cut the shorter radius of the near refractive curve, 7 FIGS. 2, 3 and 5. The bifocal near refractive curve is cut leaving a rim at the periphery, 8 FIGS. 2 and 3, to provide sufficient edge thickness to prevent the near segment from sliding beneath the lower lid in the reading position. With the downward gaze, the lower lid will intersect the thick lower edge of the lens and displace the lens upward and move the reading segment into the visual axis. The thick lower edge also provides the ballast to prevent rotation and to keep the near refractive segment at the bottom. Truncation may also be employed to aid in stabilization of the lens. Lenses are well tolerated in the eye as the thick edge remains at the bottom and the lower lid moves horizontal on the blink cycle and the upper lid moves vertically, The finished lens now has a molded concave surface and a convex bifocal curvature which was cut and polished without being removed from the disposable mold. The mold has served as a container for the monomer and provided the molded optical surface, which may be aspheric or may be composed of two or more spherical segments. The cup-like mold also serves as the holding block to facilitate cutting to the required thickness. The thickness of the cup bottom may be measured before adding the liquid monomer and measurements may be taken during the cutting operation and the lens thickness determined by subtracting the thickness of the cup bottom. The mold also serves as a holding fixture during the polishing operation. The lens is supported by the optical surface present on the mold, therefore, the lens material must adhere strongly to the supporting mold in order to withstand the forces of cutting and polishing.

After the lens is processed to the required specifications, the lens is removed by sharply flexing the holding fixture, separating the finished optical lens from it's support.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above constructions and methods without departing from the scope of the invention, it is intended that all matter contained in the above description shall be interpreted as illustrative and not in a limiting sense.

That which is claimed is:

1. A method of making bifocal contact lenses by the steps of providing a positive lens mold having a surface curvature corresponding to the curve required on the concave surface of the finished lens, producing a negative mold from said positive mold by applying heat and pressure to a resinous material, said resinous material being softened by heating and conforming by applied pressure to the shape and curvature for said positive mold to provide a negative resinous mold from said positive mold, providing an open top cylinder formed by the sides of the resinous mold extending upward above the negative optical curve, filling said resinous cylinder and covering said optical curve with a liquid monomer lens material which is polymerized to form a solid monolithic mass within said resinous container having one finished optical surface molded against the optical surface present on the bottom of said resinous cylinder, cutting and polishing a convex optical surface on the polymerized solid lens material by providing for the eccentric rotation of the resinous contact lens blank, eccentrically cutting a first convex radius on the resinous lens, the lens having thick and thin opposing edges, the thick edge being positioned toward the center of rotation and the thin edge positioned away from the center of rotation, repositioning the lens whereby the thin edge is toward the center of rotation and the thick edge is away from the center of rotation, cutting a second convex optical surface having a shorter radius than the first convex surface and a size smaller than the first convex surface, removing the lens from the resinous mold.

2. A lens as in claim 1 wherein the edge of the shorter radius, smaller segment does not intersect the edge of the larger, longer radius segment.

* * * * *